(12) United States Patent
Peterson et al.

(10) Patent No.: US 12,314,474 B2
(45) Date of Patent: May 27, 2025

(54) CONFIGURABLE COMPUTER INTERFACE HAVING ADAPTIVE HAPTIC INPUT RESPONSE

(71) Applicants: Jacob Peterson, Draper, UT (US); Brady Hartog, Hartford, CT (US)

(72) Inventors: Jacob Peterson, Draper, UT (US); Brady Hartog, Hartford, CT (US)

( * ) Notice: Subject to any disclaimer, the term of this patent is extended or adjusted under 35 U.S.C. 154(b) by 0 days.

(21) Appl. No.: 18/533,631

(22) Filed: Dec. 8, 2023

(65) Prior Publication Data

US 2024/0353927 A1 Oct. 24, 2024

Related U.S. Application Data

(60) Provisional application No. 63/497,001, filed on Apr. 19, 2023.

(51) Int. Cl.
| | |
|---|---|
| *G06F 3/01* | (2006.01) |
| *G06F 3/0354* | (2013.01) |
| *G06F 3/041* | (2006.01) |
| *G06F 3/04886* | (2022.01) |

(52) U.S. Cl.
CPC .......... *G06F 3/016* (2013.01); *G06F 3/03545* (2013.01); *G06F 3/04144* (2019.05); *G06F 3/04886* (2013.01)

(58) Field of Classification Search
CPC .. G06F 3/016; G06F 3/03545; G06F 3/04144; G06F 3/04886
See application file for complete search history.

(56) References Cited

U.S. PATENT DOCUMENTS

| | | | |
|---|---|---|---|
| 7,978,181 | B2 | 7/2011 | Westerman |
| 8,427,433 | B2 | 4/2013 | Edwards et al. |
| 9,823,833 | B2 | 11/2017 | Grant et al. |
| 9,981,183 | B2 | 5/2018 | Grant et al. |
| 10,365,822 | B2 | 7/2019 | Ligameri et al. |
| 10,401,962 | B2 | 9/2019 | Rihn |
| 10,474,358 | B2 | 11/2019 | Martin et al. |

(Continued)

OTHER PUBLICATIONS

Block et al., Touch-Display Keyboards: Transforming Keyboards into Interactive Surfaces, CHI 2010: Tangible UI, 10 pages.

(Continued)

*Primary Examiner* — Chun-Nan Lin
(74) *Attorney, Agent, or Firm* — Thorpe North & Western, LLP

(57) ABSTRACT

A configurable computer interface can include a display panel, a touch sensitive input layer, a haptic feedback layer, a memory device, and a housing. The display panel can be adapted to display an input pattern including input keys, where the input pattern is arbitrarily configurable. The haptic feedback layer can include haptic response elements distributed across the haptic feedback layer, where the haptic response elements create a haptic response across the input pattern to physical touches from the user. The memory device can include instructions that cause the configurable computer interface to: receive an input pattern profile and create the input pattern; send the input pattern to the display panel; receive user input signals from the touch sensitive input layer; and generate a haptic response signal in a region of the location of the physical touches.

27 Claims, 11 Drawing Sheets

(56) References Cited

U.S. PATENT DOCUMENTS

| | | |
|---|---|---|
| 11,467,676 B2 | 10/2022 | Norwalk et al. |
| 2003/0179190 A1 | 9/2003 | Franzen |
| 2009/0195512 A1 | 8/2009 | Pettersson |
| 2010/0149111 A1* | 6/2010 | Olien ................. G06F 3/041 |
| | | 345/173 |
| 2010/0225600 A1 | 9/2010 | Dai et al. |
| 2015/0185842 A1* | 7/2015 | Picciotto ............ G06F 3/04144 |
| | | 345/173 |
| 2015/0261296 A1* | 9/2015 | Yoshikawa ........... G06F 3/0416 |
| | | 345/173 |
| 2020/0167037 A1* | 5/2020 | Lee ..................... G06F 3/0446 |
| 2024/0246115 A1* | 7/2024 | Chen .................... G06F 3/044 |

OTHER PUBLICATIONS

Go et al., CATKey: Customizable and Adaptable Touchscreen Keyboard with Bubble Cursor-Like Visual Feedback, Interdisciplinary Graduate School of Medicine and Engineering, University of Yamanashi, Interact 2007, LNCS 4662, Part 1, 4 pages.

Jansen et al., MudPad: Tactile Feedback and Haptic Texture Overlay for Touch Surfaces, RWTH Aachen University, ITS'10, 2010, https://doi.org/10.1145/1936652.1936655, 4 pages.

\* cited by examiner

CONFIGURABLE COMPUTER INTERFACE HAVING ADAPTIVE HAPTIC INPUT RESPONSE

CROSS REFERENCE TO RELATED APPLICATIONS

This application claims the benefit of U.S. Provisional Application Ser. No. 63/497,001 filed on Apr. 19, 2023, which is incorporated herein by reference.

BACKGROUND

The computer keyboard and mouse has been the predominant hardware interface for desktop computers for over six decades. Technology has progressed dramatically over the years, but the way we interface with computers has largely remained the same.

The late twentieth century saw the advent of personal computers as the primary instrument of knowledge workers and as the tool that has impacted virtually every industry ever since. The transition to this new paradigm has continued until the present day, and recent circumstances have caused it to accelerate. The coronavirus pandemic of 2020 prompted the expansion of remote work as many businesses realized they could sustain their operations through digital communication while workers stayed at home. As remote work has increasingly replaced onsite work—including meetings, presentations, interviews, and so on—the role of the personal computer has broadened even further.

It appears the ever-broadening role of personal computers in the workplace has engendered dissatisfaction with traditional computer interfaces, even prior to the pandemic. The most recent decade has seen the advent of tablet computers, touchscreen laptops, "ergonomic" peripherals and similar developments, all of which aim to modify or augment the traditional computer interface. We believe these developments reflect a widespread cultural shift in thinking about what computers can be, what they can do, and how we can interface with them. This cultural shift is a prime opportunity to innovate the computer interface.

SUMMARY

This invention relates to a configurable computer interface, comprising a display panel, a touch sensitive input layer, a haptic feedback layer, an optional force input assembly, a memory device, and a housing. The display panel can be adapted to display an input pattern including a plurality of input keys, wherein the input pattern is arbitrarily configurable. The touch sensitive input layer can be oriented adjacent the display panel and can be adapted to recognize a location of physical touches from a user. The haptic feedback layer can include an array of haptic response elements distributed across the haptic feedback layer, wherein the haptic response elements are in physical connection with the display panel to create a haptic response across the input pattern to the physical touches from the user. The haptic response can be created at any location across the input pattern. Generally, the haptic feedback layer and the touch sensitive input layer can be commensurate and cover a substantially common area. The optional force input assembly can include an array of force sensors adapted to measure a force of the physical touches. The at least one memory device can include instructions that, when executed by at least one processor, cause the configurable computer interface to: receive an input pattern profile and create the input pattern from the input pattern profile; send the input pattern to the display panel to display the input pattern; receive user input signals from the touch sensitive input layer and optionally user contact force signals from the force input assembly; and generate a haptic response signal in a region of the location of the physical touches based on the user input signals and optionally the contact force signals. The display layer is used to graphically show dynamic input interfaces.

The housing can be oriented and shaped to at least partially enclose the display panel, the touch sensitive input layer, the haptic feedback layer, and the optional force input assembly, and wherein the housing allows access of a user to the touch sensitive input layer. User input access can be direct or indirect, e.g. through a clear protective layer such as a cast acrylic sheet. The clear protective layer can be smooth, or can include a frosted finish to case friction during dragging and swiping gestures, and reduce glare.

The display can offer various interface modes, such as a keyboard mode, trackpad mode, numpad mode, arrow keys mode, custom input mode, etc. These modes can appear directly underneath a user's fingertips and are seamlessly activated by gestures such as swiping or force pressing. The various keyboard layouts can be designed to support different languages (e.g. Spanish, Chinese), left-handed or right-handed people, different functional layouts (e.g. Dvorak, Colemak, ortholinear, etc.), and even split-keyboards having improved ergonomics. Additionally, the keyboard mode can show icons for common keyboard mnemonics, such as "Control+C" or "Control+V" such that when the "Control" key is held, the letters on keys now show their corresponding icons (the letter on "C" key becomes a copy icon and the letter on "V" key becomes a paste icon). The keyboard mode can also respond to gestures such as: swiping up with eight fingers will trigger caps lock or force pressing the shift key will trigger caps lock. Force presses and touches can produce haptic and/or auditory feedback. The trackpad mode can allow for touches outside of the visual bounds of the virtual trackpad on the display to re-activate the keyboard mode which can allow for fast switching between the trackpad and keyboard. Additionally, when keyboard mode is activated, moving a finger across the virtual keys can trigger the trackpad mode and can produce haptic or auditory feedback.

In one example, third-party devices or software connected to the configurable computer interface of the present disclosure can provide a custom input interface that are specific to the software. For example, a computer game can provide a custom input interface that is customized to the game features and controls, while an industrial machine can provide a custom layout for icons representing various inputs, processes, etc for that machine. In addition, the configurable computer interface of the present disclosure can accept input from a stylus that can be used to virtually create writing or sketches.

In another example, the configurable computer interface of the present disclosure also enables a user to create gesture-to-keystroke mappings. An example of such a mapping can be: swipe left with your two right fingers to send the "Control+C" or "Control+V" keystroke, which is a common keystroke for copying and pasting.

In still another example, the configurable computer interface of the present disclosure allows a user to rest their fingers on the top layer without triggering a key press. This uses the multi-touch sensitive input layer with the force sensing layer to only permit touches with a large force to trigger, for example, a key press.

In one example, the configurable computer interface of the present disclosure can contain one or more ambient light sensors to adjust the display brightness or cast virtual shadows of keyboard keys on the display layer (to give the illusion of depth).

In another example, the configurable computer interface of the present disclosure can contain one or multiple speakers to produce auditory feedback, which can be combined with haptic feedback to create immersive feedback sensations.

In one example, the configurable computer interface of the present disclosure can include a memory device or processor to generate graphics on-device or that can interface with a host machine's memory device or processor to receive graphical data. That is, the host machine can execute some or all instructions for input data or graphics processing and then transmit the output to the configurable computer interface.

In yet another example, the configurable computer interface of the present disclosure can be external to a host machine or be directly integrated with a host machine. That is, the configurable computer interface of the present disclosure can be integrated into a laptop form-factor such that the configurable computer interface of the present disclosure and the host machine are a single device.

The display panel can be any suitable display which can provide an adjustable image, and in some cases can be full color. Non-limiting examples of suitable displays can include an LCD, LED, OLED, and TFT-LCD display panels. For example, the LCD panel can be IPS, VA, TN, PLS, or AHVA. In one specific example, the display panel is a TFT-LCD display panel.

The touch sensitive input layer can be any suitable sensor layer which allows touch-based input recognition from user input (e.g. finger, stylus, etc.). Non-limiting examples of suitable sensor layers can include a projected capacitive touchscreen sensor layer, a surface acoustic wave touchscreen layer, surface capacitive touchscreen layer, infrared touchscreen layer, or a resistive touchscreen layer. In one example, the touch sensitive input layer is responsive to multiple simultaneous touches. In another example, the touch sensitive layer is only single-touch responsive (i.e., not responsive to multiple simultaneous touches). The touch sensitive input layer can have a responsive area substantially aligned with an entirety of a display area of the display panel. In other words, the entire display panel is touch responsive. However, in other cases the touch sensitive input layer can extend only over a portion of the display area. The touch sensitive input layer can be shaped for a specific application. Although planar input layers can be common, in some cases the input layer can be non-planar, e.g. curved.

The haptic response elements can be any mechanical elements which create a mechanical movement in the touch sensitive input layer sufficient to provide a haptic response to a user. Non-limiting examples of suitable haptic response elements can include linear resonant actuators, eccentric rotating mass devices, magnetically responsive fluids, shape memory alloys, piezoelectric elements, combinations thereof, and the like. The linear resonant actuators vibrate along a single axis which provides a highly desirable haptic effect mimicking a physical key click. However, an eccentric rotating mass can also mimic such a haptic effect to some extent.

In some examples, each of the haptic response elements include a solid-state relay such that each haptic response element can be actuated independently. The number of haptic response elements in the array is not particularly limited, but can be sufficient to allow localized delivery of a haptic response across a desired input portion of the touch sensitive input layer. The number of haptic response elements can also depend on available sizes of these elements. However, as a general guideline, the array of haptic response elements can include from 18 to 64 haptic response elements. In some examples, the haptic response elements are distributed in a regular array. Furthermore, the array can extend across substantially the display area; however, in some examples the array can extend over only a portion of the display area.

In another example, the haptic feedback layer in which the feedback produced can be both dynamic and localized. The mechanisms used to create haptic sensations can include an array of eccentric rotation mass (ERMs), linear resonant actuators (LRAs), etc. that vibrate the top layer in configurable areas for localization. This enables the feedback layer to produce independent haptic sensations of differing magnitudes, textures, or patterns in different areas on the top layer for a user's fingertips without conflicting sensations. The ERMs or LRAs can be programmed such that the independently-generated vibrational patterns can constructively or destructively interfere to create hyper-localized, magnified haptic sensations.

The force sensors can be any device which is capable of detecting and measuring force (i.e. at least the presence of force and in some cases a magnitude of the force). In one example, the force sensors are strain gauges. For example, the array of force sensors can include at least four force sensors, each including four strain gauges connected in a Wheatstone bridge configuration. In a further specific example, the force sensor input assembly can be oriented on a PCB board adjacent the haptic feedback layer opposite the display panel, and the haptic feedback layer includes openings oriented over each of the force sensors to allow deflection from the touch sensitive input layer to pass through the openings to actuate the force sensors. In another specific example, the force sensor input assembly includes a plurality of slits in the PCB board shaped to allow deflection of the strain gauges apart from a main portion of the PCB board. In another example, the array of force sensors comprises a high-resolution capacitive force sensor array as part of the touch sensitive input layer.

The at least one memory device can include one or more of a display driver, a touch sensitive layer driver, and a haptics driver, and the configurable computer interface further comprises a CPU in communication with each of the display driver, the touch sensitive layer driver, and the haptics driver.

As mentioned throughout, the configurable computer interface can provide a highly configurable, nearly arbitrary layout for virtual input keys. This layout can be provided by an input pattern profile which is used to create the input pattern as displayed on the device. As an illustration of this configurability, the input pattern can be at least one of a QWERTY keyboard layout, a split keyboard layout, a trackpad region, a numerical keypad, a custom control key layout, a gaming keyboard layout, and combinations thereof. In a more specific example, the keyboard layout can include foreign keyboard equivalents, e.g. Spanish, Chinese, Finnish, Japanese, Korean, German, etc. Other keyboard layouts can include, but are in no way limited to, Dvorak, Colemak, QGMLWY, and the like. Further, a custom control key layout can be any arbitrary key pattern for operating a device. For example, the custom control key layout can be used as a user input peripheral for operating industrial equipment such as a CNC milling machine, additive printer, incubators, sintering furnaces, industrial ovens, automated manufacturing equipment, chromatographs, spectrometers, process control consoles, and the like. Additionally, custom control key layouts can be used for software programming (e.g. integrated development environment components, version control systems, cloud services, build tools, etc.), music production (e.g. audio interfaces, graphic equalizers, track editing, etc.), and digital art (e.g. drawing interfaces, photo and video editing tools etc.).

The haptic response signal can be generated by correlating the user input signals with the location and identifying at least one nearest haptic response element for activation. In some cases, a single haptic response element can be actuated. However, in other cases, multiple nearby haptic response elements can be actuated. For example, for a user input contact location which is between two or more haptic response elements, each of the neighboring two, three or four haptic response elements can be actuated. In some cases, the actuation signal for a particular haptic response element can be weighted based on proximity to the user input contact location. In another example, the haptic response signal includes multiple weighted actuation signals to each of a plurality of proximate haptic response elements. In still another example, multiple haptic response elements can be actuated in harmony to constructively and destructively interfere to create a hyper-localized haptic response signal.

The force input assembly can provide the haptic response signal which is adjusted in magnitude based on the contact force signal from a contact force sensor.

In another example, the input pattern profile can include gesture profiles. In addition to virtual keys, user input gestures can be recognized to create specific additional functionality. For example, the gesture profiles can include one or more of: when the user begins to drag their finger over a virtual key, a trackpad modal appears underneath their finger instantaneously; force pressing on a virtual key capitalizes the letter; force pressing with two fingers simultaneously shows an arrow key modal, while executing the same gesture or tapping outside the modal will dismiss the modal; and force pressing with three fingers simultaneously shows a numpad modal, while executing the same gesture or tapping outside the modal will dismiss the modal.

The housing can provide physical protection to components of the configurable computer interface. Generally, the housing can enclose the display panel, the touch sensitive input layer, the haptic feedback layer, the force input assembly (if present), and in some cases can further enclose the at least one memory device. The housing can also include a baseplate and a perimeter frame. These housing members can be formed of any suitable material such as, but certainly not limited to, aluminum, polycarbonate, polyurethane, polyethylene, and the like.

In some examples, the configurable computer interface can further comprise an input stylus adapted to apply the physical touches from the user.

Based on these general principles, the configurable computer interface can be an integrated system, rather than a module to apply to existing systems. For example, the interface can be a drop-in replacement for existing desktop peripherals (e.g., the keyboard and mouse). The touch display and the localized haptic zones are not pre-assigned in functionality, and as such are functionality-agnostic, designed to be versatile for however the device is configured, whether or not the configuration resembles a traditional peripheral such as a keyboard or trackpad. Furthermore, the operation is not limited to a keyboard. Specifically, a user or third-party software vendor could configure the interface to input text in other ways besides traditional typing. The interface shares a similar form factor to a keyboard at least partially because it has the same ergonomic concerns as a keyboard. Other form factors can also benefit from this interface configuration. For example, the interface can extend across an entire desktop surface, can be curved, or can be custom shaped for a given task or application.

As examples of the flexibility of the configurable computer interface described herein, the following scenarios can be executed. The configurable computer interface can be configured to show any user interface (i.e., input pattern) as determined by corresponding firmware. This is because the interface presents a touchscreen with haptic feedback and force sensing. Additionally, the configurable computer interface interfaces with a host machine (a Windows, macOS, or Linux computer) via USB which can bidirectionally transmit arbitrary data between the interface and a software application running on the host machine. For example, suppose a software application running on a host machine has a sophisticated user interface with many buttons, switches, fields. Instead of a user being constrained to the traditional mouse and keyboard peripherals to interface with the software application, the software application instead "hooks into" the configurable computer interface and changes the interface to be tailored specifically for the software application. Similarly, instead of a QWERTY keyboard, the software application can show a completely dynamic interface with different buttons, toggles, sliders, and fields all of which can provide haptic feedback to the user directly underneath their fingertips. In one specific example, a SOLIDWORKS (e.g. a 3D CAD program) application can display a giant trackpad on the configurable computer interface so that a user can easily rotate, pan, and zoom the 3D model viewer by using multi-touch gestures. Alternatively, or in addition, the SOLIDWORKS can display a set of large buttons that appear on the home row that correspond to quick actions like creating a new sphere object or rotating the selected object.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1A:
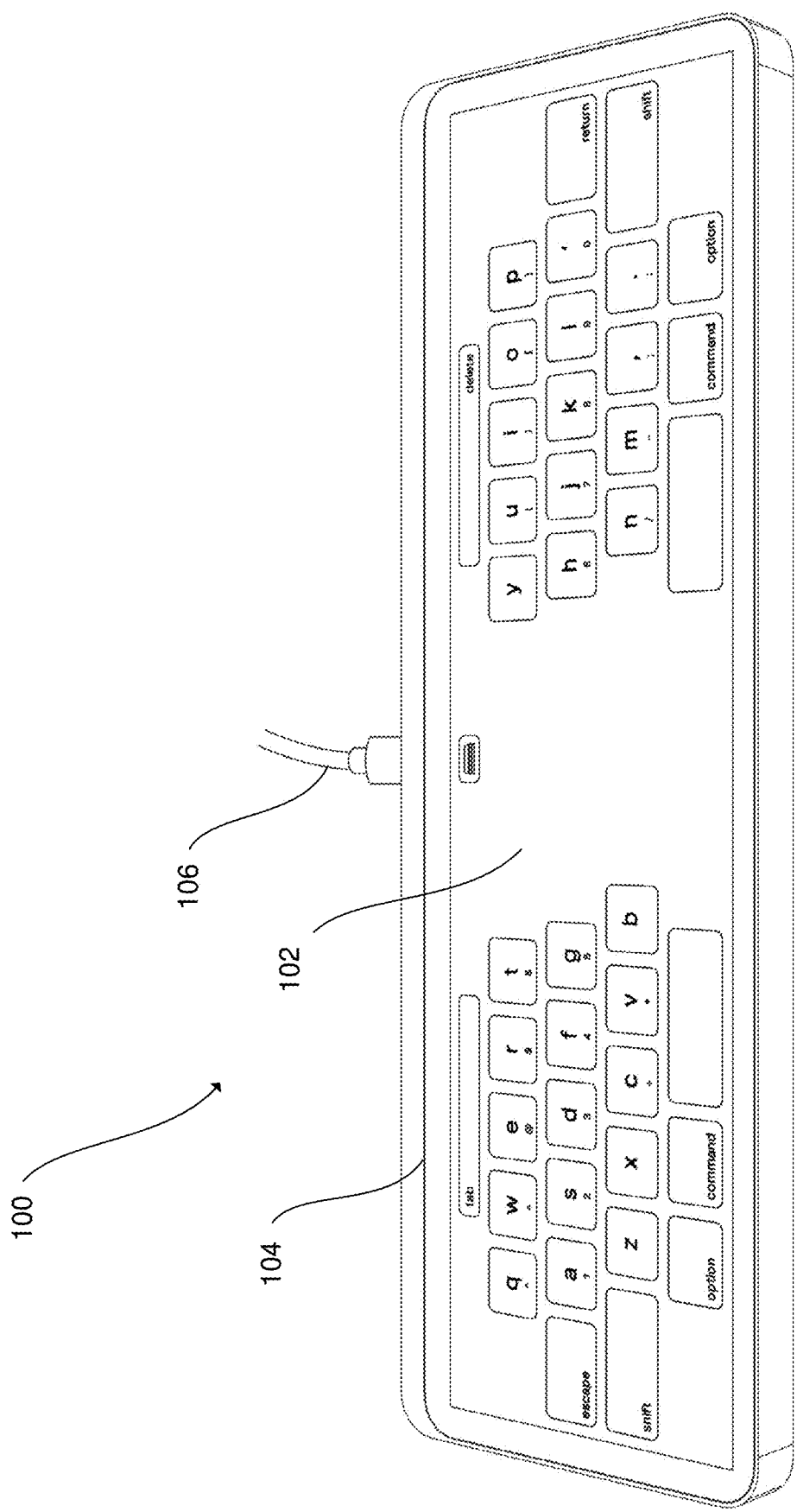
FIG. 1A is a configurable computer interface in accordance with one example of the present disclosure.

These drawings are provided to illustrate various aspects of the invention and are not intended to be limiting of the scope in terms of dimensions, materials, configurations, arrangements or proportions unless otherwise limited by the claims.

DETAILED DESCRIPTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

Definitions

In describing and claiming the present invention, the following terminology will be used.

The singular forms "a," "an," and "the" include plural referents unless the context clearly dictates otherwise. Thus, for example, reference to "a driver" includes reference to one or more of such interfaces, and reference to "the sensor" refers to one or more of such devices.

As used herein with respect to an identified property or circumstance, "substantially" refers to a degree of deviation that is sufficiently small so as to not measurably detract from the identified property or circumstance. The exact degree of deviation allowable may in some cases depend on the specific context.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility and imprecision associated with a given term, metric or value. The degree of flexibility for a particular variable can be readily determined by one skilled in the art. However, unless otherwise enunciated, the term "about" generally connotes flexibility of less than 2%, and most often less than 1%, and in some cases less than 0.01%.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "at least one of" is intended to be synonymous with "one or more of." For example, "at least one of A, B and C" explicitly includes only A, only B, only C, or combinations of each.

Numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a numerical range of about 1 to about 4.5 should be interpreted to include not only the explicitly recited limits of 1 to about 4.5, but also to include individual numerals such as 2, 3, 4, and sub-ranges such as 1 to 3, 2 to 4, etc. The same principle applies to ranges reciting only one numerical value, such as "less than about 4.5," which should be interpreted to include all of the above-recited values and ranges. Further, such an interpretation should apply regardless of the breadth of the range or the characteristic being described.

Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; and b) a corresponding function is expressly recited. The structure, material or acts that support the means-plus function are expressly recited in the description herein. Accordingly, the scope of the invention should be determined solely by the appended claims and their legal equivalents, rather than by the descriptions and examples given herein.

Example Embodiments

Referring now to FIG. 1, there is depicted a configurable computer interface device 100 according to an embodiment of the present disclosure. As will be described in more detail below, the device 100 is a new kind of hardware interface that synthesizes the functionality of the keyboard and mouse into a single device. Touch sensors, force sensors, and localized haptic impulses all combine to mimic the feeling of pressing keys on a physical keyboard. Unlike existing computer interfaces, the device 100 dynamically adapts to any computing task, all while staying directly beneath the user's fingertips. For power users of desktop computers, the device 100 can provide a more efficient, seamless, and enjoyable user experience compared to the traditional peripherals.

The device 100 can include a display 102 mounted in a streamlined housing 104 that approximates the footprint of a traditional keyboard. This experience includes a "plug and play" feature which will allow a user to plug the device 100 into any computer and immediately get to work using a standard cable 106, such as a USB cable. By using the preexisting USB Human Interface Devices (HID) protocol, a user can use both the virtual keyboard and trackpad on the device 100 without the need to install an operating system driver.

As will be explained below, the device 100 implements an array of linear resonant actuators (LRAs) to provide haptic feedback in response to user input. The lack of tactile feedback on a touchscreen makes it more difficult to type efficiently and quickly compared to a traditional mechanical keyboard so an LRA array is used to mitigate this problem. The LRA array induces vibrations in the proximity of a user's touch to create localized haptic impulses. The LRA array can have a sufficient number of LRA units to provide desired haptic responses which are spatially localized. The number of LRAs can depend on a size of the device 100, but as a general guideline can include from 12 to 100 LRAs, in some examples, 20 to 60, and in one example, 33 LRAs can be used. Furthermore, the device 100 features four symmetrically arranged load surfaces. When a user depresses the top panel of the display 102, the load surfaces precisely capture the applied force using strain gauges and high-resolution analog-to-digital converters. This creates a localized force sensor that is used to deter erroneous taps and gestures the user may accidentally trigger and to add an extra dimension to user input.

The tension between the display 102 and the main display of a host computer (not shown) can be managed. To effectively manage the tension can mean that the dynamic elements of the display 102 are carefully constrained so as not to distract the user from the main display. Notably, the device 100 can be particularly useful as an input peripheral where a separate main display is used. However, in some cases, the device 100 can function as both the input interface and primary display interface (i.e. no separate display of information). In these configurations, all or a portion of the display layer can include a touch responsive portion.

A feature of the device 100 is that it is a zero-travel keyboard that emulates the tactility of a traditional mechanical keyboard on a touchscreen. A zero-travel keyboard consists of a computer keyboard with keys that do not travel, that is, the keyboard is completely flat. The device 100 can restore the tactility of a mechanical keyboard by providing localized haptics via an LRA array and an optional audio feedback (e.g. click) via an integrated stereo speaker system. By varying the latency, bandwidth, and strength of the vibration the LRAs produce, another dimension of user feedback is possible, making the user experience on the device 100 much more intuitive. A user can experience a smooth transition from a mechanical keyboard to the device 100 because of the ample and effective feedback to the user.

Figure 1B:
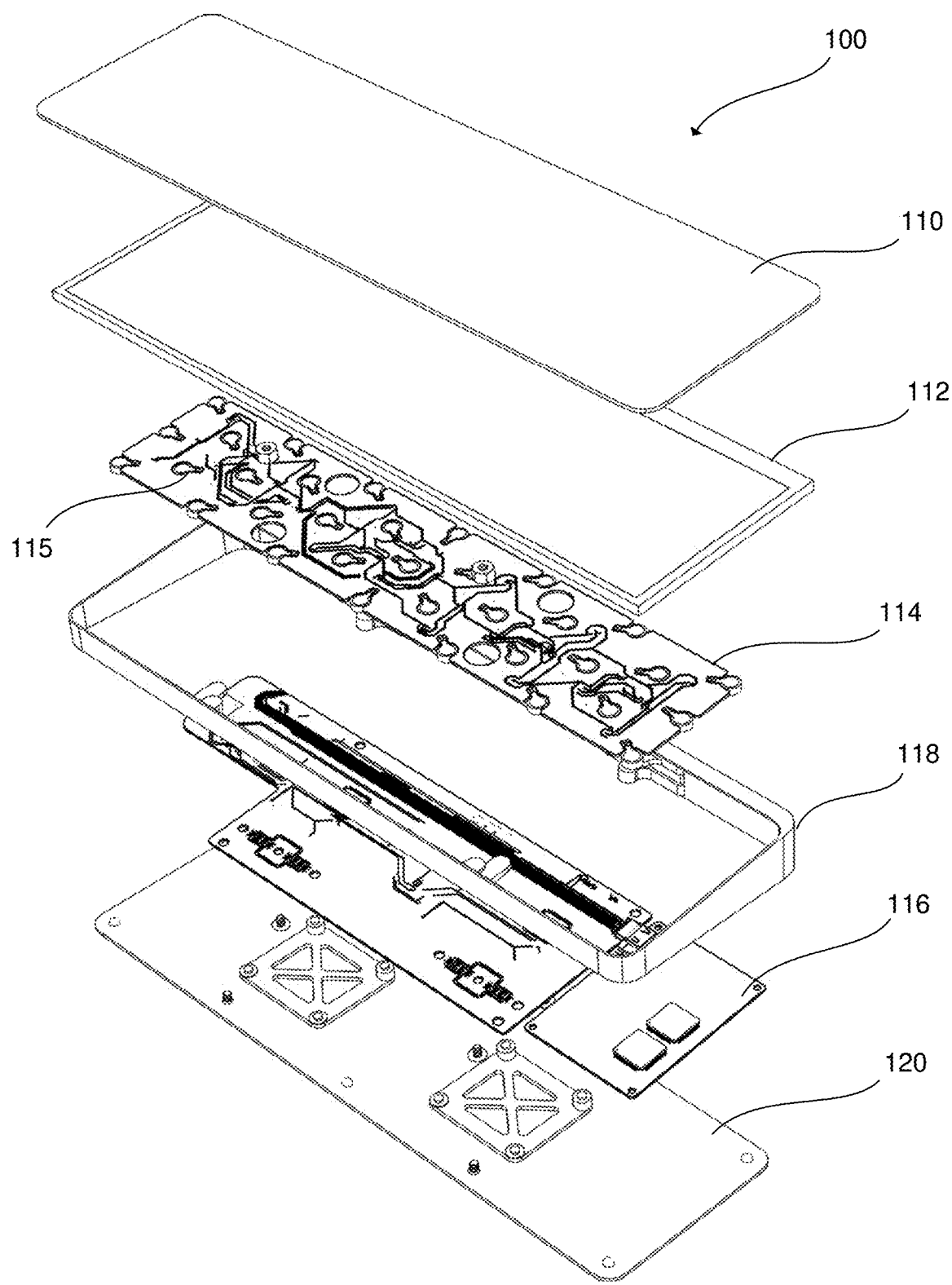
FIG. 1B is an exploded top perspective view of the assembly of FIG. 1A.
Figure 1C:
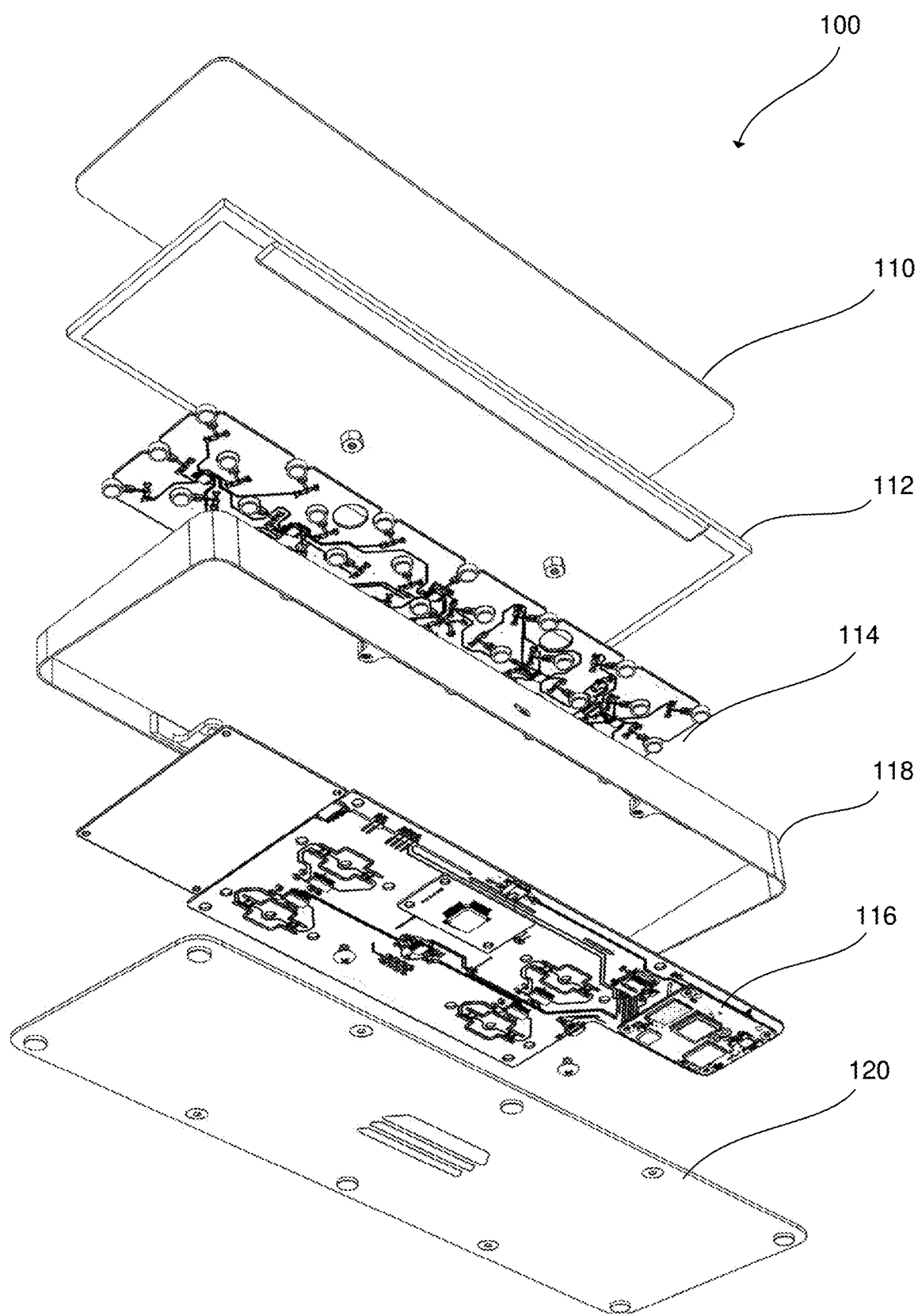
FIG. 1C is an exploded bottom perspective view of the assembly of FIG. 1A.
Figure 1D:
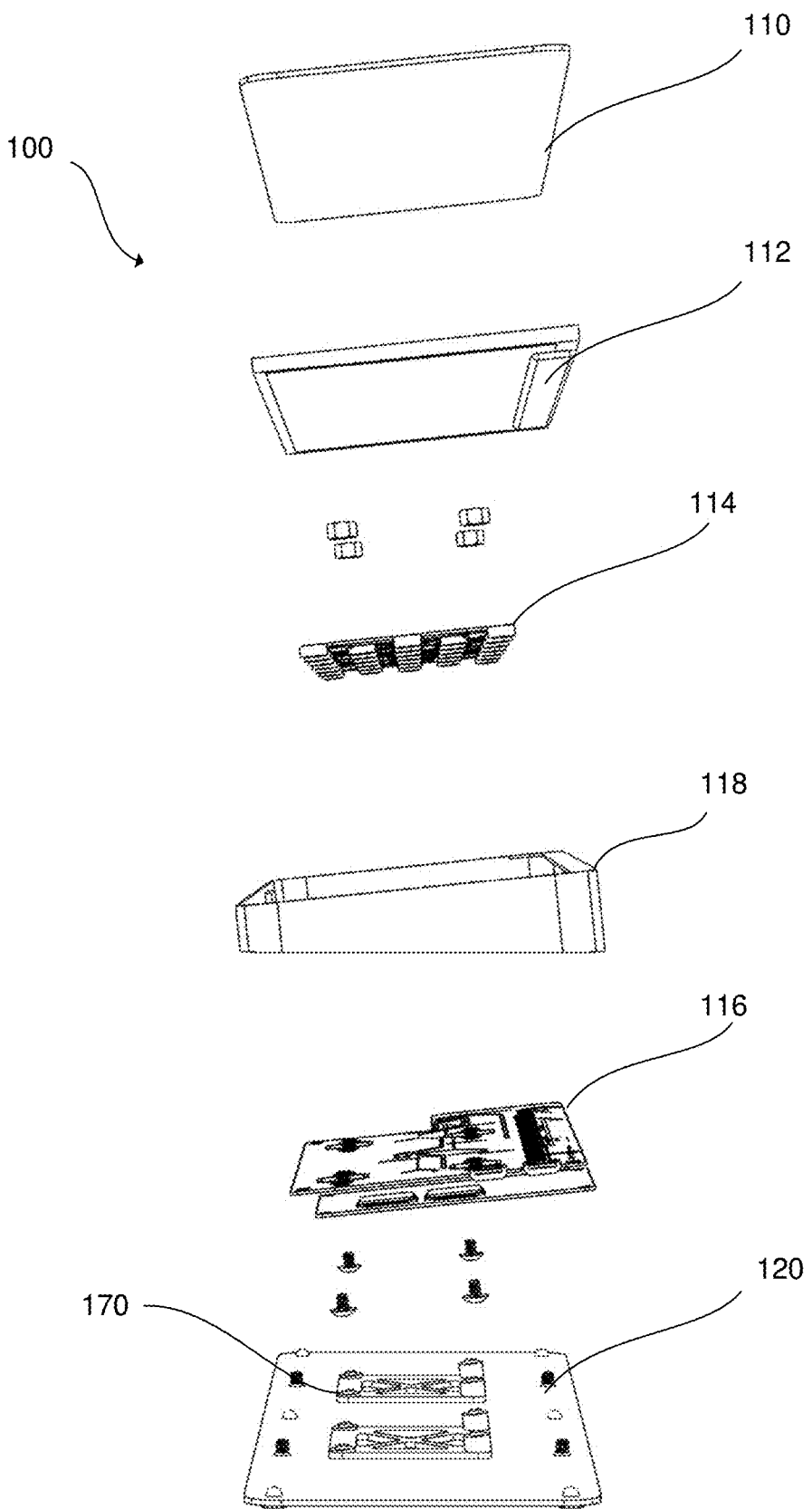
FIG. 1D is an exploded side view of the assembly of FIG. 1A.

Referring now to FIG. 1B, there is depicted an exploded view of the device 100. The device 100 includes a top panel 110, a display module 112, a haptics board 114, a motherboard assembly 116, a body 118 and a baseplate 120. Each of these will now be explained.

The top panel 110 is formed of a clear material, such as glass or plastic. The top panel 110 can be a non-glare top panel adhered with liquid optically clear adhesive. The display module 112 can include a stretch liquid crystal display (LCD) panel and a projective capacitive touchscreen (PCAP) touch panel. It will be appreciated that other display technologies can be used, including light-emitting diode (LED). Four threaded standoffs are adhered to the back of the display module 112 using a cold weld epoxy solution and are used to internally mount the display assembly as well as to transfer force from user input to the load surfaces.

Figure 7:
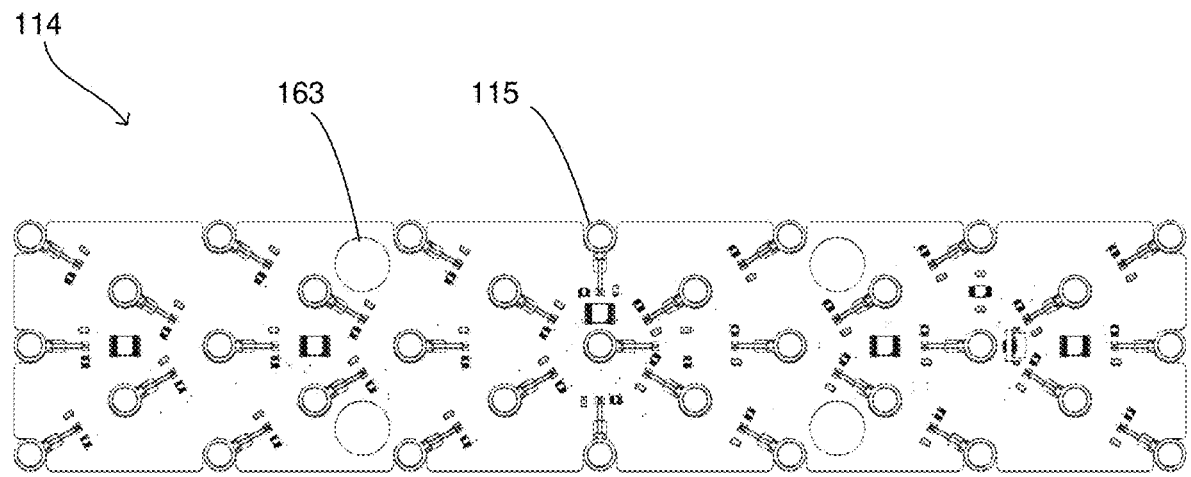
FIG. 7 is a top view of the haptics board in accordance with another example.
Figure 8:
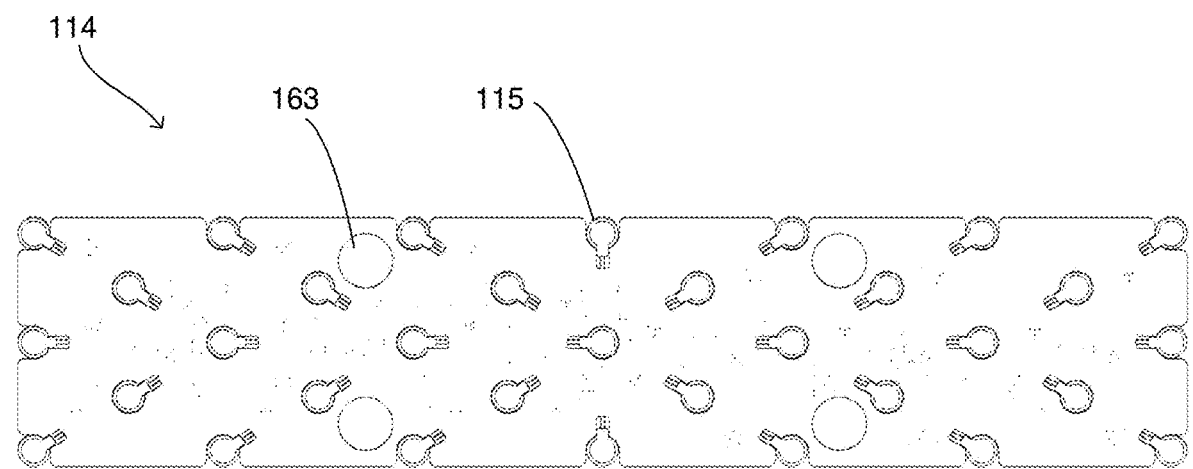
FIG. 8 is a bottom view of the haptics board in accordance with another example.

The haptics board 114 contains any array of linear resonant actuators 115, or LRAs, that vibrate along the z-axis to provide localized haptic impulses to a user's fingertips. Each LRA is controlled by a metal oxide semiconductor, or MOS-based, solid-state relay, or SSR, which allows the firmware to control each LRA independently. These LRAs are driven by a haptic driver and the SSRs are switched using IO port expanders. The haptics board interfaces with the motherboard through a flexible printed circuit cable, or FPC. In an embodiment, the haptics board 114 contains between 20-40 LRAs, or 33 LRAs. For example, as shown in FIGS. 7, and 8, in an embodiment, the haptics board 114 contains 33 linear resonant actuators 115, or LRAs, that vibrate along the z-axis to provide localized haptic impulses to a user's fingertips. Each LRA is controlled by a metal oxide semiconductor, or MOS-based, solid-state relay, or SSR, which allows the firmware (see FIG. 2) to control each LRA independently. These LRAs are driven by a haptic driver and the SSRs are switched using IO port expanders. The haptics board interfaces with the motherboard through a flexible printed circuit cable, or FPC.

Figure 5:
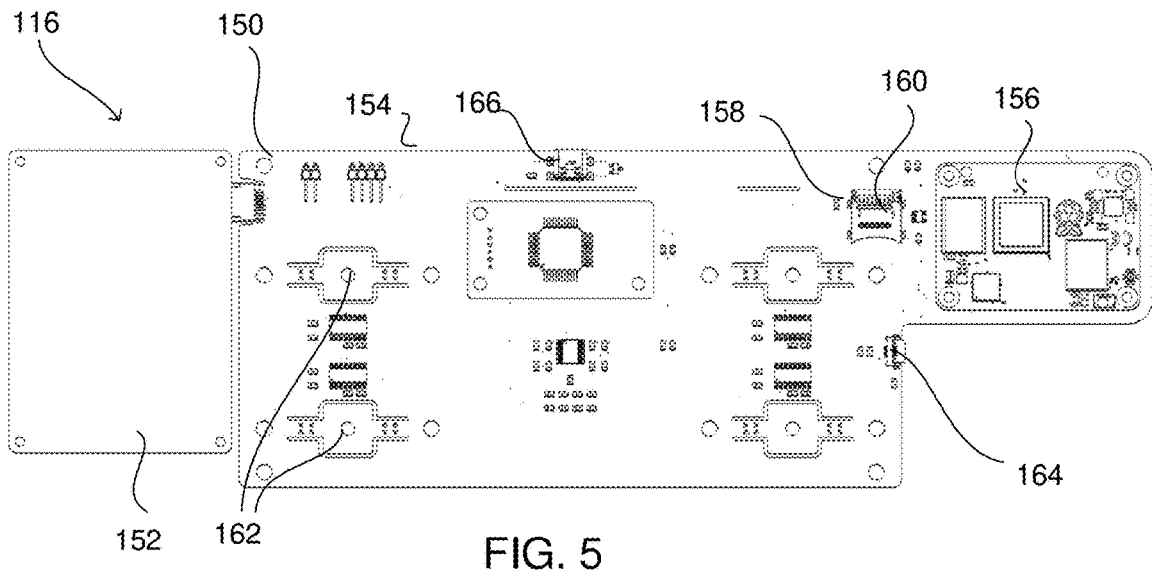
FIG. 5 is a schematic illustration of a motherboard assembly in accordance with an example of the present disclosure.
Figure 6A:
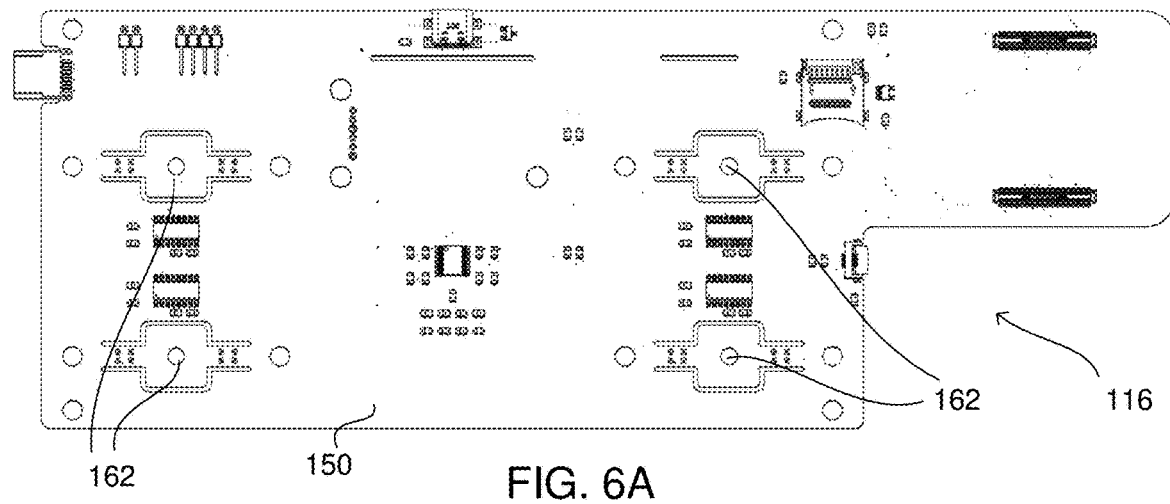
FIG. 6A is a schematic top illustration of the motherboard assembly in which the force sensors are clearly visible in accordance with an example of the present disclosure.
Figure 6B:
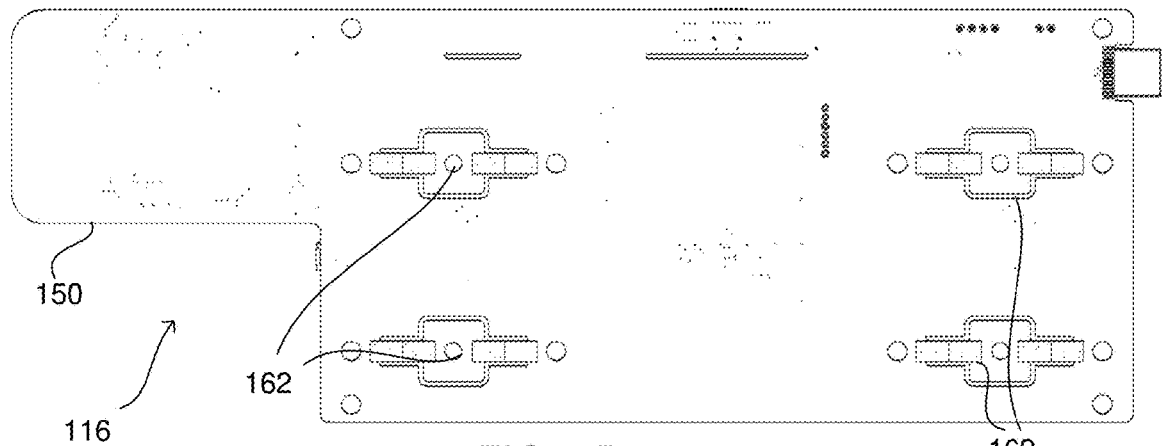
FIG. 6B is a schematic bottom illustration of the motherboard assembly in accordance with an example of the present disclosure.

Referring back to FIG. 1B, the mother board assembly 116 is the central communications backbone and connectivity point through which the display module 112, the haptics board 114, and the host computer (not shown) to which the device 100 is connected interface. As shown in FIGS. 5, 6A and 6B, in an embodiment, the motherboard assembly 116 includes a main mother board 150 and three daughter boards, namely, a display driver board 152, a touch panel driver board 154, and a main processor board 156. Each of these will be described below.

The display driver board 152 drives the display module 112 via a digital video and optionally audio interface, such as HDMI. Other interfaces can be used, including but not limited to USB, DVI, DisplayPort, and VGA. The display driver board 152 can include graphics hardware chipset and a display driver software that allows the firmware to work with the display module 112.

The touch panel driver board 154 drives the touch panel and can sense multiple touches, including up to ten touches or more touches simultaneously. The main processor board 156 includes a processor and memory and is responsible for running the firmware and interfacing with all the other hardware components. In an embodiment, the main processor board 156 includes a Raspberry Pi Compute Module 4. A micro-SD card slot 158 with a micro-SD card 160 can be used as the nonvolatile storage medium. It will be appreciated that any suitable nonvolatile memory can be used, including but not limited to flash memory, ferroelectric random-access memory (FeRAM), magnetic random-access memory (MRAM), phase-change memory (PCM), and RRAM.

The main mother board 150 can further include four load surfaces 162 that are symmetrically arranged to precisely measure the force applied by a user's touch to the top panel 110. In this example, each load surface 162 consists of four strain gauges configured in a Wheatstone bridge and one high resolution analog-to-digital convertor 164. Openings 163 formed in the haptics board 114 (see FIGS. 7 and 8) are oriented over each of the force sensors to allow deflection from the touch sensitive input layer to pass through the openings 163 to actuate the force sensors.

A USB-C connector 166 is used to supply power and provide data transmission with a host computer. Of course, any suitable wired or wireless interface with the host computer can be used. In an embodiment, the device 100 can include a re-chargeable battery and use a wireless communication protocol, such as Bluetooth® technology.

Referring to FIGS. 1C, 1D, 1E, 3 and 4, the enclosure for the above components can include a body 118 and baseplate 120. The body 118 and the baseplate 120 can be formed of aluminum, plastic, or any other suitable material. Three-D printed internal structures 170 are adhered to the aluminum body and baseplate using a cold weld epoxy solution. These internal structures provide mechanical support for the internal components. The baseplate 120 includes rubber feet 172.

Figure 2:
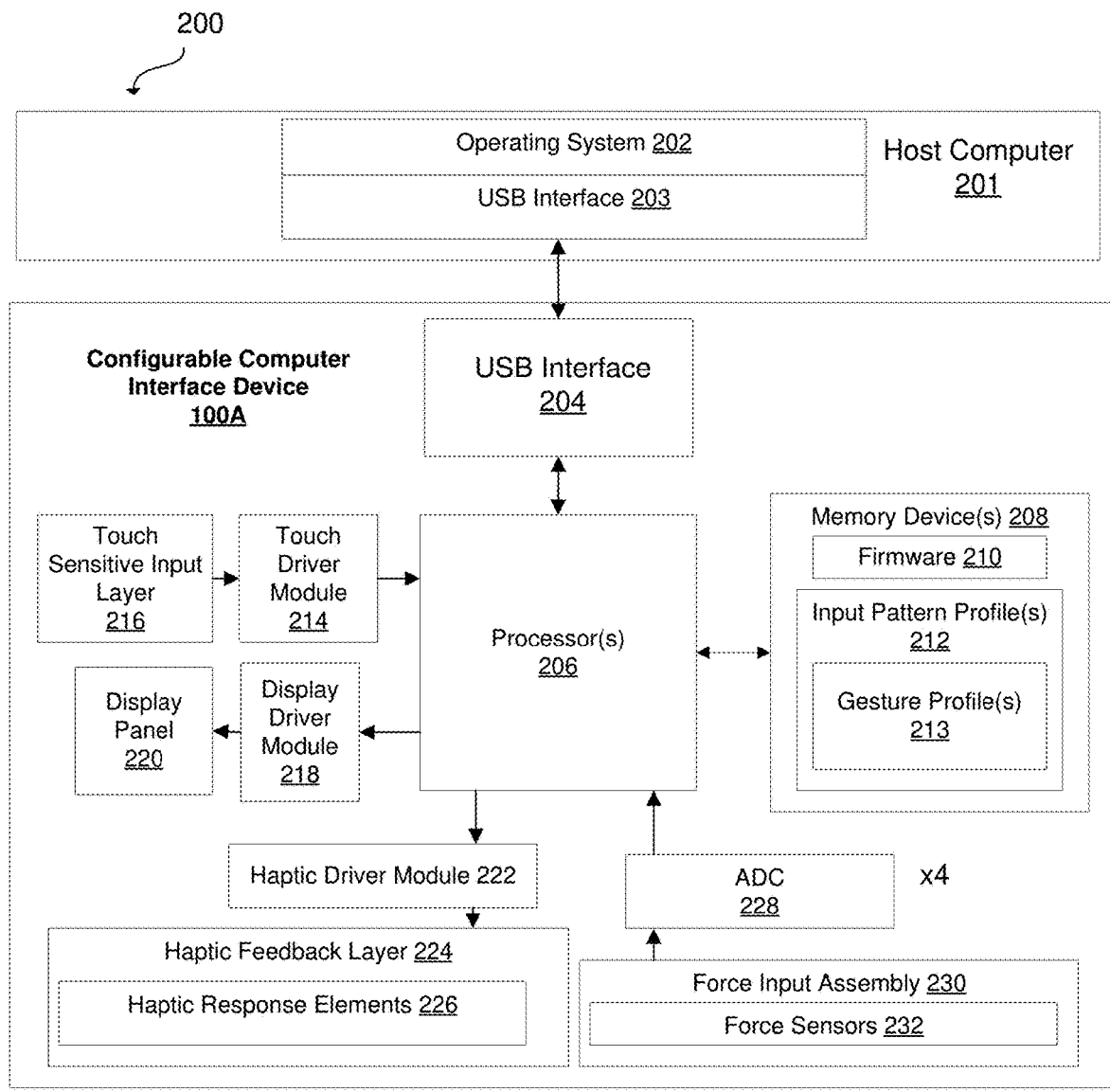
FIG. 2 is a schematic illustration of a system overview in accordance with another example.
Figure 3:
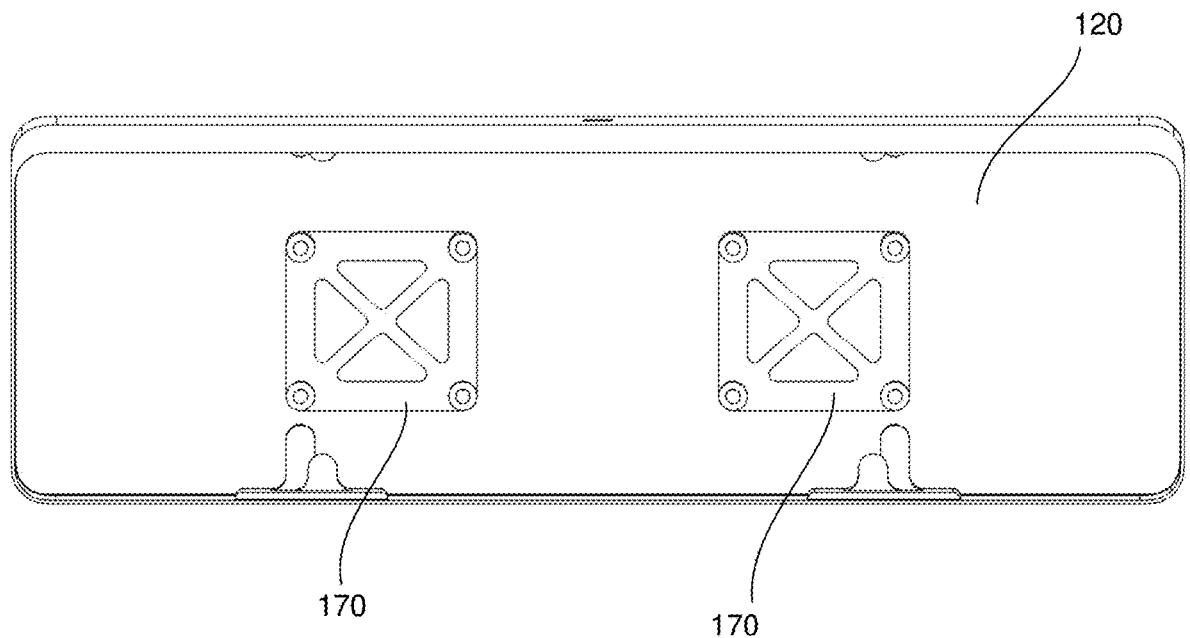
FIG. 3 is a top view of the enclosure baseplate forming part of the housing in accordance with one example.
Figure 4:
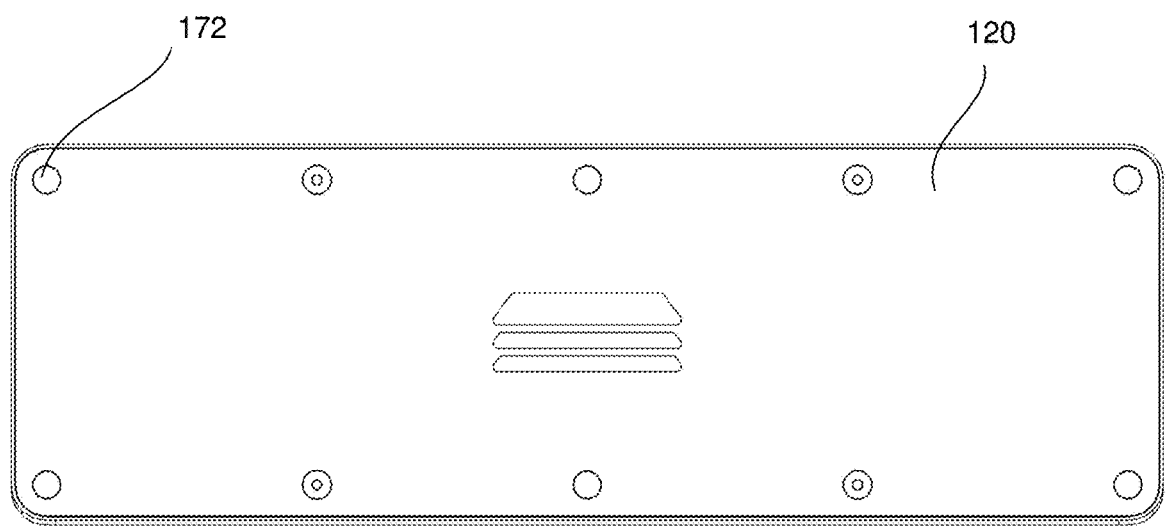
FIG. 4 is a bottom view of the enclosure baseplate in accordance with another example.

Referring now to FIG. 2, there is depicted a block diagram of a system 200 having a host computer 201 and a configurable computer interface device 100A according to an embodiment of the present disclosure. The host computer 201 can be any computing system that typically uses a peripheral input device, including a desktop, laptop, mobile phone or tablet. The host computer 201 can include an operating system 202, such as a variant of a Microsoft® Windows®, Andriod® or Apple® MacOS® operating systems. The host computer 201 can further include a main display (not shown). The host computer 201 can further include a USB interface 203 that includes USB root hub software and a USB port (neither shown).

The device 100A can include a USB interface 204 connected to the USB interface 203 on the host computer 201 by a USB cord (not shown). Of course, other types of interfaces of wired and wireless design can be used. The device 100A can receive power through the USB connection as well as engage in two-way communications with the host computer 201. The device 100A can include at least one processor 206 connected to at least one memory device 208. The memory device 208 can store firmware 210 and at least one input panel profile 212.

The input pattern profile 212 can provide a highly configurable, nearly arbitrary layout for virtual input keys. For example, as shown in FIG. 1A, the display 102 can show a split QWERTY keyboard arrangement. In another example, FIG. 9, the display 102 can show a trackpad to move a cursor on a display connected to the host computer 201. In another example, FIG. 10, the display 102 can show a menu selection. These virtual layouts and others can be defined by the input pattern profile 212 which is used to create the input pattern as displayed on the device 100A.

In an embodiment, the input pattern defined by the input pattern profile 212 is arbitrarily configurable. As an illustration of this configurability, the input pattern can be at least one of a QWERTY keyboard layout, a split keyboard layout, a trackpad region, a numerical keypad, a custom control key layout, a gaming keyboard layout, and combinations thereof. In a more specific example, the keyboard layout can include foreign keyboard equivalents, e.g. Spanish, Chinese, Finnish, Japanese, Korean, German, etc. Other keyboard layouts can include, but are in no way limited to, Dvorak, Colemak, QGMLWY, and the like. Further, a custom control key layout can be any arbitrary key pattern for operating a device. For example, the custom control key layout can be used as a user input peripheral for operating industrial equipment such as a CNC milling machine, additive printer, incubators, sintering furnaces, industrial ovens, automated manufacturing equipment, chromatographs, spectrometers, process control consoles, and the like. Additionally, custom control key layouts can be used for software programming (e.g. integrated development environment components, version control systems, cloud services, build tools, etc.), music production (e.g. audio interfaces, graphic equalizers, track editing, etc.), and digital art (e.g. drawing interfaces, photo and video editing tools etc.). The input pattern profile 212 can include multiple input pattern profiles such that a user can select between them. To be clear, the input pattern can be at least one of a QWERTY keyboard layout, a split keyboard layout, a trackpad region, a numerical keypad, a custom control key layout, a gaming keyboard layout, and combinations thereof. In an embodiment, the input pattern profile 212 can be provided by the host computer 201 through the USB interface to the device 100A.

The input pattern profile 212 can further define gesture profiles 213. The gesture profiles 213 provide the ability to the device 100A to recognize and interpret movements of a user's touches in order to interact with and control the host computer 201. Examples of gesture controls include single and multiple finger drags, the level of force exerted by one or more fingers, drags by single or multiple fingers that are in a recognized pattern, taps, and the like. The gesture controls can be linked to execute commands on either the device 100A and/or the host computer 201.

In an embodiment, the gesture controls defined by the gesture profiles 213 can include one or more of the following: when the user begins to drag their finger over a virtual key, a trackpad modal appears underneath their finger instantaneously; force pressing on a virtual key capitalizes a letter; force pressing with two fingers simultaneously shows an arrow key modal, while repeating or tapping outside the modal will dismiss the modal; and force pressing with three fingers simultaneously shows a numpad modal, while repeating or tapping outside the modal will dismiss the modal. Of course, other gesture controls are possible.

The device 100A further includes a touch driver module 214 in communication with the processor 206. The touch driver module 214 can include a chipset and software driver to interface with a touch sensitive input layer 216. In an embodiment, the touch sensitive input layer 216 is one of a projected capacitive touchscreen sensor layer, a surface acoustic wave touchscreen layer, surface capacitive touchscreen layer, infrared touchscreen layer, or a resistive touchscreen layer. The touch sensitive input layer 216 can be responsive to multiple simultaneous touches. The touch sensitive input layer 216 can have a responsive area substantially aligned with a display area of a display panel. The touch sensitive input layer 216 can be non-planar.

The device 100A further includes a display driver module 218 in communication with the processor 206. The display driver module 218 can include a chipset and driver software to interface with a display panel 220. The display panel 220 can include one of an LCD, LED, and OLED type display. The display panel 220 can display full color images, including animation, images, graphics, and the like. The display panel 220 can display input patterns as defined by the input pattern profile 212.

The device 100A further includes a haptic driver module 222 in communication with the processor 206. The haptic driver module 222 can include a chipset and driver software to interface with a haptic feedback layer 224. The haptic feedback layer 224 can include haptic response elements 226, that can include linear resonant actuators or eccentric rotating mass devices. The haptic feedback layer 224 can include an array of the haptic response elements 226 distributed across the haptic feedback layer 224, where the haptic response elements 226 are in physical connection with the display panel 220 to create a haptic response across the input pattern to the physical touches from the user. The haptic response elements 226 can include a solid-state relay such that each haptic response element can be actuated independently. The haptic response elements 226 can include from 18 to 64 haptic response elements. The haptic response elements 226 can be distributed in an array or randomly. The array can extend across substantially an entirety of the display area of the display panel 220.

In an embodiment, the memory device 208 further includes one or more of a display driver, a touch sensitive layer driver, and a haptics driver.

The device 100A further includes at least one analog to digital converter 228 in communication with a force input assembly 230. The force input assembly can include force sensors 232. The force sensors 232 provide information regarding the amount of force exerted by touches of a user on the display panel 220. That is, the force sensors 232 allow the device 100A to distinguish between light touches, medium touches and strong touches. In an embodiment, the force sensors 232 are strain gauges. The force sensors 232 can be distributed in an array or randomly. The array of force sensors 232 can include at least four force sensors, each including four strain gauges connected in a Wheatstone bridge configuration. In an embodiment, the force input assembly 230 is oriented on a PCB board adjacent the haptic feedback layer 224 opposite the display panel 220, and the haptic feedback layer 224 includes openings oriented over each of the force sensors 232 to allow deflection from the touch sensitive input layer 216 to pass through the openings to actuate the force sensors 232. The force input assembly 230 can include a plurality of slits in the PCB board shaped to allow deflection of the strain gauges apart from a main portion of the PCB board. The array of force sensors 232 comprise a high-resolution capacitive force sensor array as part of the touch sensitive input layer.

In an embodiment, the firmware 210 includes instructions that when executed by the processor 206, causes the processor 206 to perform the tasks described herein, including but not limited to: receive an input pattern profile and create the input pattern from the input pattern profile; send the input pattern to the display panel to display the input pattern; receive user input signals from the touch sensitive input layer and optionally user contact force signals from the force input assembly; and generate a haptic response signal in a region of the location of the physical touches based on the user input signals and optionally the contact force signals. In an embodiment, the haptic response signal can be generated by correlating the user input signals with the location and identifying at least one nearest haptic response element 226 for activation. The haptic response signal can include multiple weighted actuation signals to each of a plurality of proximate haptic response elements 226. In an embodiment, the force input assembly 230 is not optional, and the haptic response signal is adjusted in magnitude based on the contact force signal from the force sensors 232. In an embodiment, an input stylus 234 can be adapted to apply the physical touches to the display panel 220 from a user.

In an embodiment, the firmware 210 includes instructions that when executed by the processor 206, causes the processor 206 to perform the tasks described herein, including but not limited to: receive user input signals from a touch sensitive input layer; reference an input pattern to correlate the user input signals with a location on the touch sensitive input layer; and generate a haptic response signal to actuate at least one haptic response element proximate the location, wherein the input pattern is configurable. The haptic response signal can be generated by correlating the user input signals with the location and identifying at least one nearest haptic response element for activation. The haptic response signal includes multiple weighted actuation signals to each of a plurality of proximate haptic response elements. The instructions further cause the processor to adjust the haptic response signal in magnitude based on a contact force signal from a contact force sensor.

In an embodiment, the firmware 210 includes instructions that when executed by the processor 206, causes the processor 206 to perform the tasks described herein, including but not limited to: receive an input pattern profile and create the input pattern from the input pattern profile; send the input pattern to the display panel to display the input pattern; receive user input signals from the touch sensitive input layer and optionally user contact force signals from the force input assembly; and generate a haptic response signal in a region of the location of the physical touches based on the user input signals and optionally the contact force signals. The input pattern profile includes gesture profiles.

The device 100A can further include a housing oriented and shaped to at least partially enclose the display panel 220, the touch sensitive input layer 216, the haptic feedback layer 224, and the optional force input assembly 230, and where the housing allows access of a user to the touch sensitive input layer 216.

Figure 9:
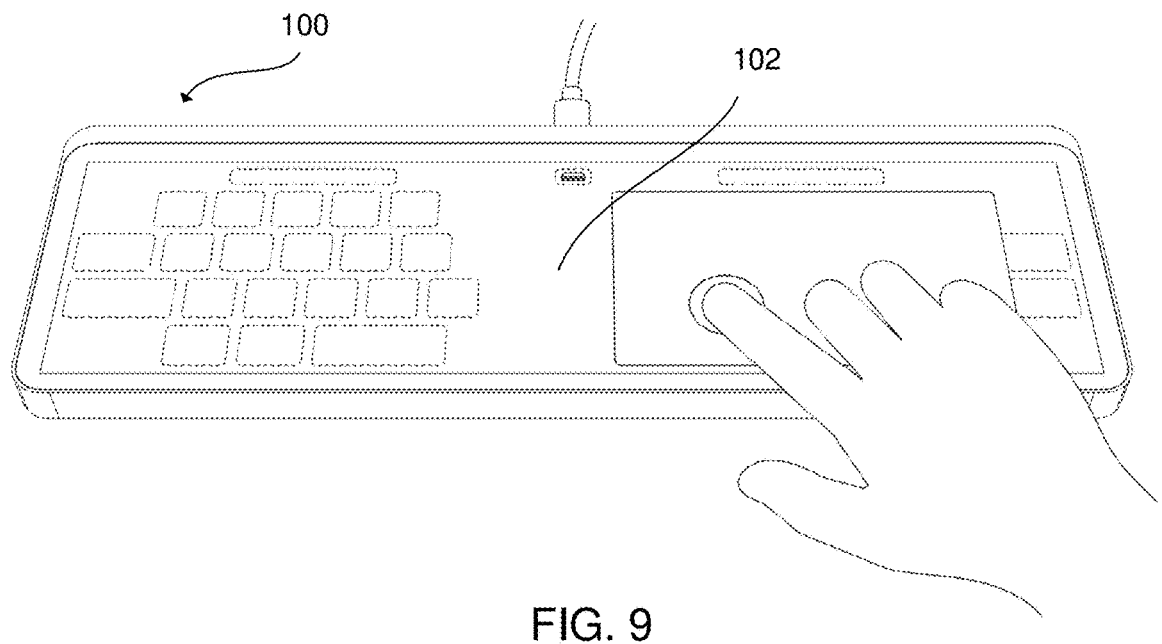
FIG. 9 is an illustration of a demonstration pattern showing a trackpad in accordance with another example of the present disclosure.
Figure 10:
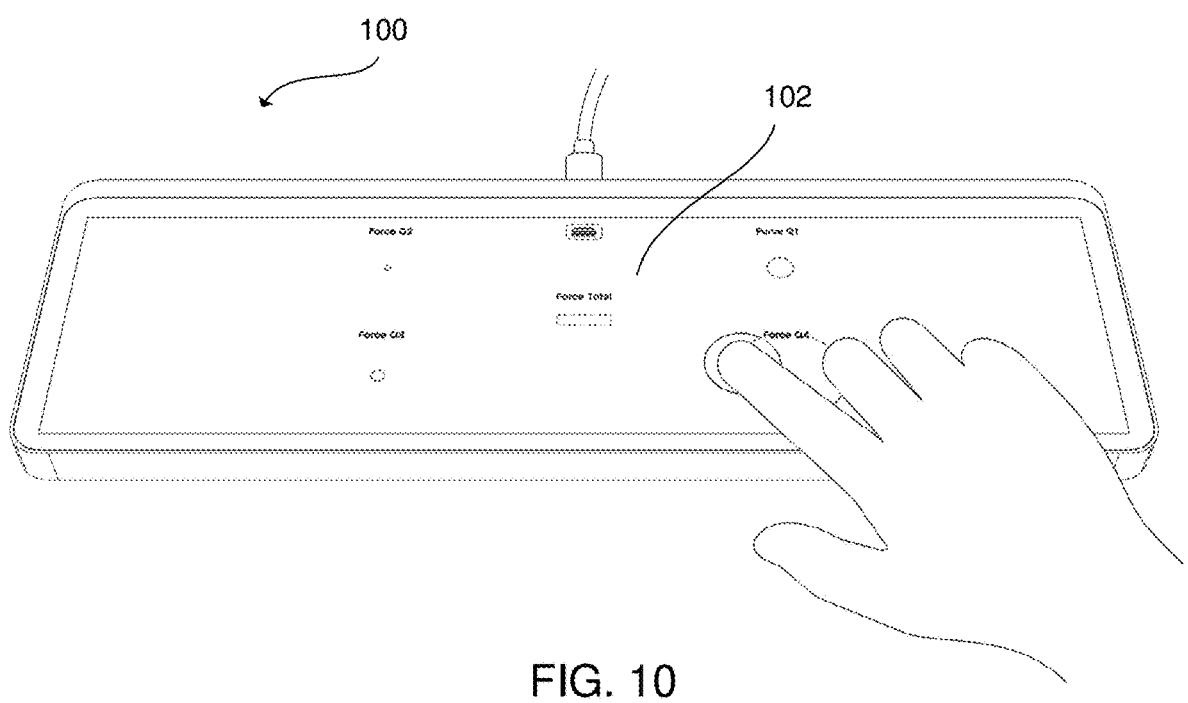
FIG. 10 is an illustration of a demonstration pattern showing load surfaces and force response measurements in accordance with another example of the present disclosure.

A number of demonstrations accessible through the firmware 210 show the capabilities of the device 100A. Specifically, FIG. 1 presents a virtual split keyboard for improved typing ergonomics and an updated keyboard layout for improved typing efficiency. FIG. 9 shows a trackpad view. When a user's finger moves across the keys, a virtual trackpad seamlessly appears beneath the user's fingertips. Tapping outside the virtual trackpad returns the user to the keyboard. FIG. 10 captures a moment from a firmware demonstration that visualizes the localized measurements of the four load surfaces. The greater the force applied by a user's touch, the larger the circle at the fingertip appears. The rectangle in the center depicts the average of the four load surface measurements.

Figure 11:
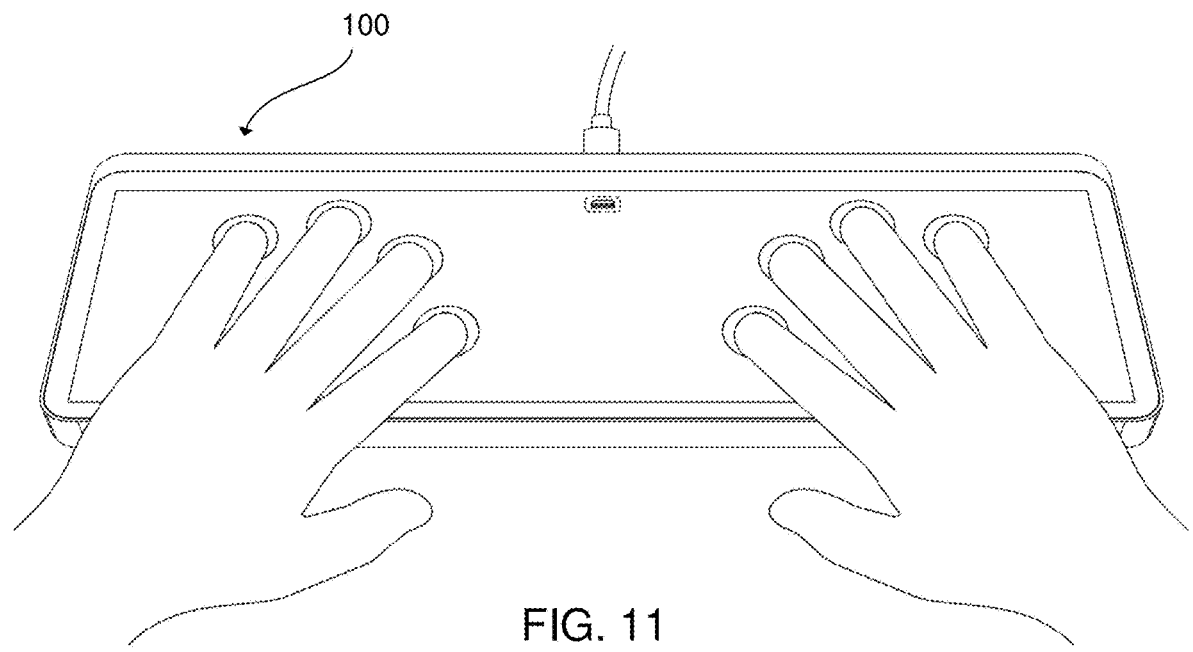
FIG. 11 is an illustration of a demonstration pattern showing touch responses in accordance with another example of the present disclosure.
Figure 12:
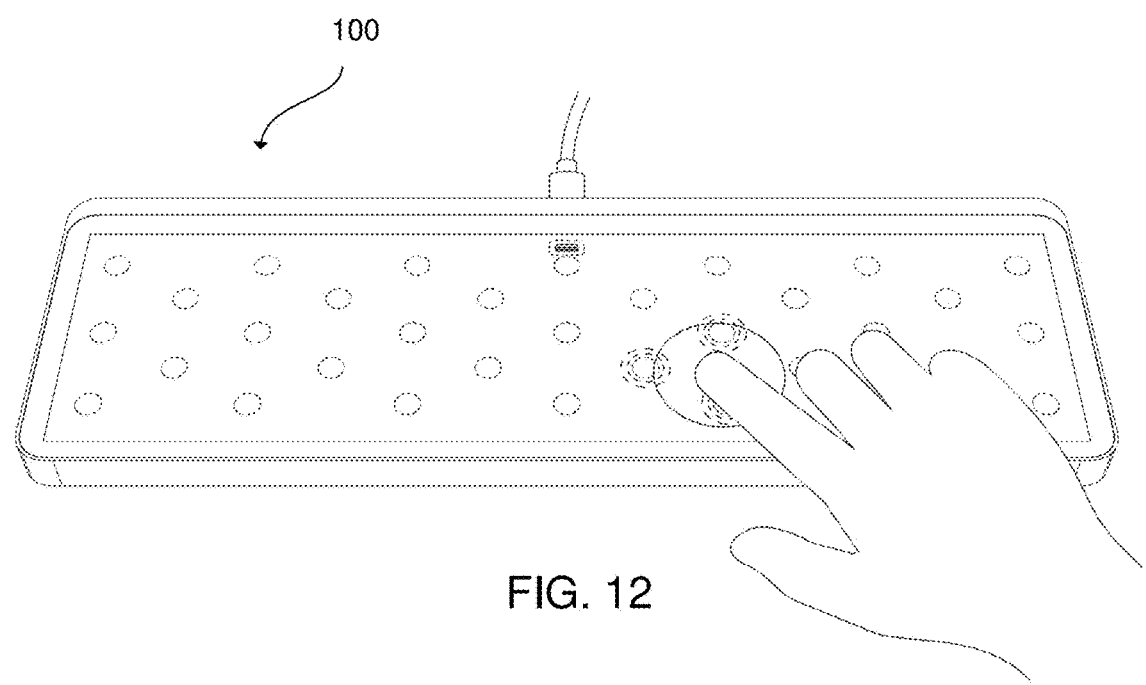
FIG. 12 is an illustration of a demonstration pattern showing haptic response elements and force response measurement in accordance with another example of the present disclosure.

FIGS. 11 and 12 each capture a moment from a firmware demonstration that visualizes the touch sensing, force sensing, and localized haptic feedback. Underneath every red circle is an LRA that vibrates when it is close enough to a user's touch. The vibrational amplitude of the LRAs surrounding a touch is proportional to the applied force. The haptic sensations delivered by the vibrating LRAs is localized due to the direct mechanical coupling between a user's touch and the surrounding LRAs.

Figure 13:
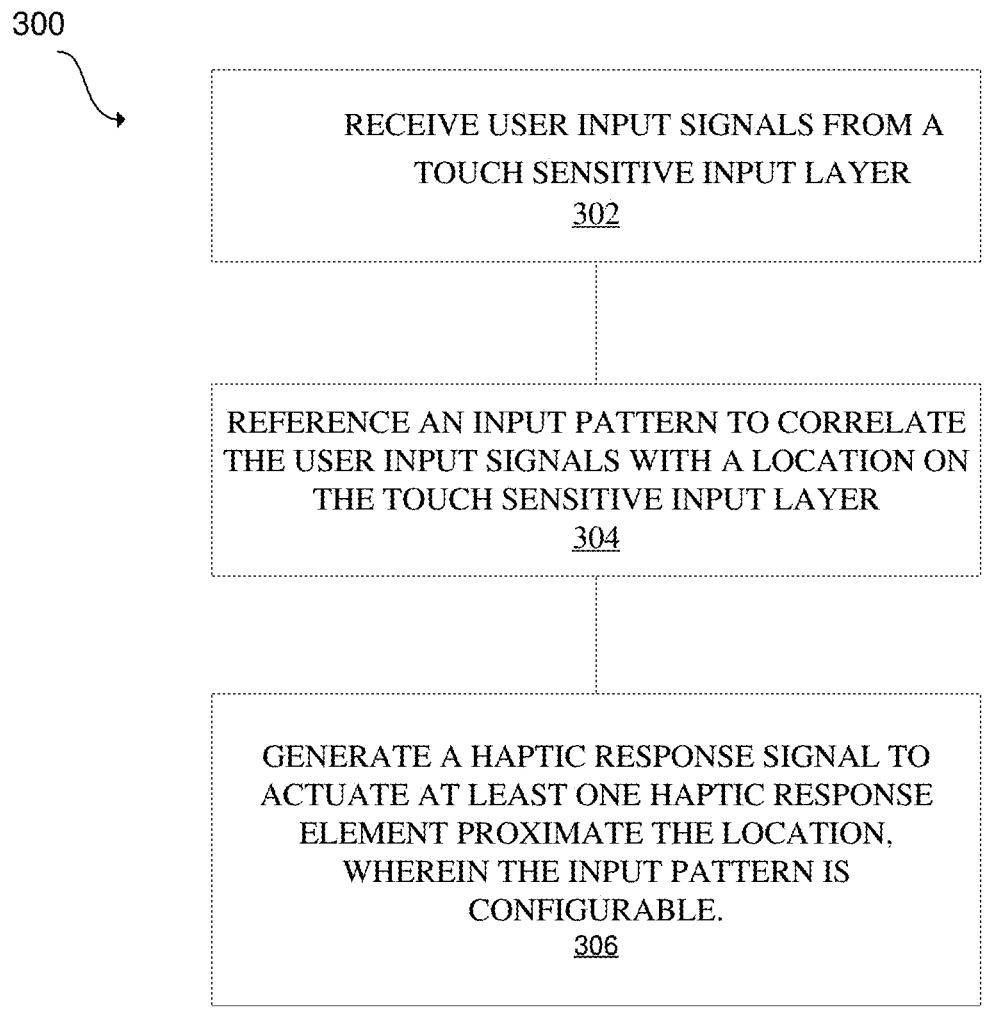
FIG. 13 is flow chart in accordance with another example of the present disclosure.

Referring to FIG. 13, with reference to FIG. 2, there is depicted a flowchart 300 according to an embodiment of the present disclosure. At step 302, the processor 206 receives user input signals from a touch sensitive input layer 216. At step 304, the processor 206 references an input pattern defined by an input pattern profile 212 to correlate the user input signals with a location on the touch sensitive input layer 216. At step 306, the processor 206 generates a haptic response signal to actuate at least one haptic response element 226 proximate the location, wherein the input pattern is configurable.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine-readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A configurable computer interface, comprising:
   a display panel adapted to display an input pattern including a plurality of input keys, wherein the input pattern is arbitrarily configurable;
   a touch sensitive input layer oriented adjacent the display panel and adapted to recognize a location of physical touches from a user;
   a haptic feedback layer including an array of haptic response elements distributed across the haptic feedback layer, wherein the haptic response elements are in physical connection with the display panel to create a haptic response across the input pattern to the physical touches from the user;
   an optional force input assembly including an array of force sensors adapted to measure a force of the physical touches;
   at least one memory device including instructions that, when executed by at least one processor, cause the configurable computer interface to:
      receive an input pattern profile and create the input pattern from the input pattern profile;
      send the input pattern profile to the display panel to display the input pattern;
      receive user input signals from the touch sensitive input layer and optionally user contact force signals from the force input assembly; and
      generate a haptic response signal in a region of the location of the physical touches based on the user input signals and optionally the contact force signals; and
   a housing oriented and shaped to at least partially enclose the display panel, the touch sensitive input layer, the haptic feedback layer, and the optional force input assembly, and wherein the housing allows access of a user to the touch sensitive input layer.

2. The configurable computer interface of claim 1, wherein the display panel is a liquid crystal display (LCD), light emitting diode (LED) or organic light emitting diode (OLED) display panel.

3. The configurable computer interface of claim 2, wherein the display panel is a thin film transistor liquid crystal display (TFT-LCD) display panel.

4. The configurable computer interface of claim 1, wherein the display panel displays full color images.

5. The configurable computer interface of claim 1, wherein the touch sensitive input layer is a projected capacitive touchscreen sensor layer, a surface acoustic wave touchscreen layer, surface capacitive touchscreen layer, infrared touchscreen layer, or a resistive touchscreen layer.

6. The configurable computer interface of claim 1, wherein the touch sensitive input layer is responsive to multiple simultaneous touches.

7. The configurable computer interface of claim 1, wherein the touch sensitive input layer has a responsive area substantially aligned with a display area of the display panel.

8. The configurable computer interface of claim 1, wherein the touch sensitive input layer is non-planar.

9. The configurable computer interface of claim 1, wherein the haptic response elements are linear resonant actuators or eccentric rotating mass devices.

10. The configurable computer interface of claim 9, wherein each of the haptic response elements include a solid-state relay such that each haptic response element can be actuated independently.

11. The configurable computer interface of claim 1, wherein the array of haptic response elements includes from 18 to 64 haptic response elements.

12. The configurable computer interface of claim 1, wherein the haptic response elements are distributed in a regular array.

13. The configurable computer interface of claim 1, wherein the array extends across substantially an entirety of the display area.

14. The configurable computer interface of claim 1, wherein the force sensors are strain gauges.

15. The configurable computer interface of claim 14, wherein the array of force sensors includes at least four force sensors, each including four strain gauges connected in a Wheatstone bridge configuration.

16. The configurable computer interface of claim 15, wherein the force sensor input assembly is oriented on a printed circuit board (PCB) adjacent the haptic feedback layer opposite the display panel, and the haptic feedback layer includes openings oriented over each of the force sensors to allow deflection from the touch sensitive input layer to pass through the openings to actuate the force sensors.

17. The configurable computer interface of claim 16, wherein the force sensor input assembly includes a plurality of slits in the PCB shaped to allow deflection of the strain gauges apart from a main portion of the PCB.

18. The configurable computer interface of claim 1, wherein the array of force sensors comprises a high-resolution capacitive force sensor array as part of the touch sensitive input layer.

19. The configurable computer interface of claim 1, wherein the at least one memory device includes a display driver, a touch sensitive layer driver, and a haptics driver, and the configurable computer interface further comprises a central processing unit (CPU) in communication with each of the display driver, the touch sensitive layer driver, and the haptics driver.

20. The configurable computer interface of claim 1, wherein the input pattern is at least one of a QWERTY keyboard layout, a split keyboard layout, a trackpad region, a numerical keypad, a custom control key layout, a gaming keyboard layout, and combinations thereof.

21. The configurable computer interface of claim 1, wherein the haptic response signal is generated by correlating the user input signals with the location and identifying at least one nearest haptic response element for activation.

22. The configurable computer interface of claim 21, wherein the haptic response signal includes multiple weighted actuation signals to each of a plurality of proximate haptic response elements.

23. The configurable computer interface of claim 21, wherein the force input assembly is not optional, and the haptic response signal is adjusted in magnitude based on the contact force signal.

24. The configurable computer interface of claim 1, wherein the input pattern profile includes gesture profiles.

25. The configurable computer interface of claim 24, wherein the gesture profiles include one or more of:
  a. when the user begins to drag their finger over a virtual key, a trackpad modal appears underneath their finger instantaneously;
  b. force pressing on a virtual key capitalizes a letter;
  c. force pressing with two fingers simultaneously shows an arrow key modal, while repeating or tapping outside the modal will dismiss the modal; and
  d. force pressing with three fingers simultaneously shows a numpad modal, while repeating or tapping outside the modal will dismiss the modal.

26. The configurable computer interface of claim 1, wherein the housing further encloses the at least one memory device.

27. The configurable computer interface of claim 1, further comprising an input stylus adapted to apply the physical touches from the user.

* * * * *